United States Patent
Chan (10) Patent No.: US 7,065,745 B2
(45) Date of Patent: Jun. 20, 2006

(54) SYSTEM AND METHOD FOR EVALUATING AND EXECUTING HIERARCHIES OF RULES

(75) Inventor: Ming Chan, Toronto (CA)

(73) Assignee: Sun Microsystems, Inc., Santa Clara, CA (US)

(*) Notice: Subject to any disclaimer, the term of this patent is extended or adjusted under 35 U.S.C. 154(b) by 372 days.

(21) Appl. No.: 10/320,035

(22) Filed: Dec. 16, 2002

(65) Prior Publication Data

US 2004/0117765 A1    Jun. 17, 2004

(51) Int. Cl.
*G06F 9/44* (2006.01)
*G06F 17/00* (2006.01)

(52) U.S. Cl. .................. 717/117; 717/116; 717/108; 706/46; 706/47

(58) Field of Classification Search ............... 717/100, 717/102, 106, 114, 116, 118, 117; 707/6, 707/203; 703/6; 709/202; 719/316, 318; 706/15, 45, 46–48, 50; 705/38
See application file for complete search history.

(56) References Cited

U.S. PATENT DOCUMENTS

| | | | |
|---|---|---|---|
| 4,658,370 A | | 4/1987 | Erman et al. |
| 4,837,735 A | * | 6/1989 | Allen et al. .................. 706/10 |
| 4,866,635 A | * | 9/1989 | Kahn et al. .................. 706/46 |
| 4,912,648 A | | 3/1990 | Tyler |
| 5,113,342 A | * | 5/1992 | Zamora ......................... 704/9 |
| 5,119,470 A | | 6/1992 | Highland et al. |
| 5,159,687 A | * | 10/1992 | Richburg ..................... 717/106 |
| 5,204,939 A | * | 4/1993 | Yamazaki et al. ............. 706/50 |
| 5,204,940 A | | 4/1993 | Kitagawa et al. |
| 5,353,385 A | * | 10/1994 | Tano et al. .................... 706/48 |
| 5,408,587 A | | 4/1995 | Maier et al. |
| 5,423,041 A | * | 6/1995 | Burke et al. ................. 717/117 |
| 5,493,678 A | * | 2/1996 | Arcuri et al. .................. 707/1 |
| 5,596,752 A | * | 1/1997 | Knudsen et al. ............ 717/117 |
| 5,615,308 A | * | 3/1997 | Ando et al. .................... 706/48 |
| 5,619,621 A | | 4/1997 | Puckett |
| 5,678,013 A | * | 10/1997 | Smith et al. ................ 715/866 |
| 5,682,535 A | * | 10/1997 | Knudsen ..................... 717/117 |
| 5,710,894 A | * | 1/1998 | Maulsby et al. ............ 715/763 |
| 5,809,212 A | * | 9/1998 | Shasha ......................... 706/46 |
| 5,983,020 A | * | 11/1999 | Sweeney et al. ............ 717/141 |
| 6,073,142 A | | 6/2000 | Geiger et al. |
| 6,108,670 A | * | 8/2000 | Weida et al. ............... 707/203 |
| 6,208,720 B1 | | 3/2001 | Curtis et al. |

(Continued)

OTHER PUBLICATIONS

TITLE: A Frame work for specifying Explicit Bias for revision of approximate information extraction rules, author: Feldman et al, ACM, 2000.*

(Continued)

*Primary Examiner*—Chameli C. Das
(74) *Attorney, Agent, or Firm*—Robert C. Kowert; Meyertons, Hood, Kivlin, Kowert & Goetzel, P.C.

(57) ABSTRACT

Embodiments of a system and method for hierarchically organizing rules and for evaluating and executing the hierarchy of rules. Each rule in the hierarchy of rules may include a precondition and an action to be executed if the precondition is met. When evaluating and executing the rules, if a precondition of a rule in the hierarchy is not met, then the action of the rule is not executed. Further, rules that descend from the rule in the hierarchy of rules are precluded from evaluation and execution. In one embodiment, modification of the hierarchy of rules may be performed without modification to an application using the hierarchy of rules.

43 Claims, 7 Drawing Sheets

U.S. PATENT DOCUMENTS

| | | | |
|---|---|---|---|
| 6,216,098 B1 * | 4/2001 | Clancey et al. | 703/6 |
| 6,275,976 B1 * | 8/2001 | Scandura | 717/120 |
| 6,412,020 B1 * | 6/2002 | Leach et al. | 719/316 |
| 6,473,896 B1 * | 10/2002 | Hicken et al. | 717/132 |
| 6,505,176 B1 * | 1/2003 | DeFrancesco et al. | 705/38 |
| 6,557,025 B1 * | 4/2003 | Hattori et al. | 709/202 |
| 6,560,592 B1 * | 5/2003 | Reid et al. | 707/2 |
| 6,606,625 B1 * | 8/2003 | Muslea et al. | 707/6 |
| 6,662,235 B1 * | 12/2003 | Callis et al. | 719/318 |
| 6,681,380 B1 | 1/2004 | Britton et al. | |
| 6,741,974 B1 * | 5/2004 | Harrison et al. | 706/47 |
| 6,769,124 B1 * | 7/2004 | Schoening et al. | 719/316 |
| 6,856,980 B1 | 2/2005 | Feldman et al. | |
| 2001/0029499 A1 | 10/2001 | Tuatini et al. | |
| 2002/0032688 A1 | 3/2002 | Serrano et al. | |
| 2002/0099834 A1 | 7/2002 | Sielaff et al. | |
| 2002/0120484 A1 | 8/2002 | Bantz et al. | |
| 2002/0199171 A1 | 12/2002 | Dharamshi | |
| 2003/0040935 A1 | 2/2003 | Magee | |
| 2003/0069736 A1 | 4/2003 | Koubenski et al. | |
| 2003/0069737 A1 | 4/2003 | Koubenski et al. | |
| 2003/0217332 A1 | 11/2003 | Smith et al. | |
| 2003/0217333 A1 | 11/2003 | Smith et al. | |
| 2004/0024888 A1 | 2/2004 | Davis et al. | |

OTHER PUBLICATIONS

TITLE: Hierarchical Fuzzy Configuration of Implementation Strategies, author: Sodan et al, ACM, 1998.*

TITLE: Weakest Precondition Semantics for Refinement of Object-Oriented Programs, author: Cavalcanti et al, IEEE, Feb. 2000.*

WebSphere Application Server Enterprise Services, "Business Rule Beans (BRBeans)," IBM Corp. 2001, pp. 1-49.

Daniel Selman, "Java Rule Engine API JSR-94," Java Community Process. http://java.sun.com/jcp/, Version 1.3, Jul. 29, 2002, 51 pages.

* cited by examiner

Rule Interface
810

SYSTEM AND METHOD FOR EVALUATING AND EXECUTING HIERARCHIES OF RULES

BACKGROUND

1. Field of the Invention

This invention relates to computer systems, and more particularly to organizing rules for evaluation by a rules engine.

2. Description of the Related Art

Businesses often realize cost reductions and efficiencies by automating process flows. For example, replacing manual processes (e.g., data entry, error diagnosis and correction) with automated processes provided by a computer system may lead to reduced business costs and smaller decision making cycles. Such automated processes are typically modeled and represented as rules separate from software code. The key underlying technology is typically a rules engine. The rules engine may be used to interpret and evaluate if-then statements that are often referred to as rules. The "if" portion of a rule may include conditions (e.g., amount greater than $100) and the then portion of rules may include actions (e.g., set discount to 5%). The inputs to the rules engine may be a collection of rules (e.g., rule set, rule execution set) and some information often referred to as facts (e.g., an actual amount such as $5.00). The outputs from a rules engine are generally determined by the facts and may include the original facts with possible modifications, new facts or some other computer system action (e.g., send an email, create new output, correct a problem) as a result of performing the specified actions of a rule.

Automated processes of businesses are sometimes difficult to model and may frequently change. For example, processes may evolve and rules that make a certain operation possible may become outdated due to an emerging technology. Rules are often used for many interconnected purposes. For example, rules may be reaction rules (e.g., when critical alarms on a network occur, pinpoint each critical alarm and recommend the best action) that when changed (e.g., modified, removed) may impact other rules. The conventional way of viewing the organization of rules is similar to a set of if-then statements.

Rules conventionally fire or execute in a sequence. For example, the condition of rule one is evaluated and if satisfied, the action of rule one is then executed and the condition of rule two is evaluated and if satisfied, the action of rule two is executed, and so forth. As rules sometimes change frequently and are often interconnected, maintenance of such rules may be difficult. For example, several rules may be highly dependent on a certain rule and removing the rule may require changes to each of the several rules and potentially even the computer system itself.

The organization of rules may also impose constraints on run-time evaluation of the rules. Computer systems that have the capacity to analyze data and draw inferences (e.g., rules engine) often rely heavily on pattern-matching algorithms. Rules may be part of numerous searches involving a many-to-many match among patterns identified in rules and facts. Considering the potential multitude of rules and facts, the number of rules evaluated may increase. For example, each set of if-then statements may be evaluated more than once although many of the rules may rely on the same condition that has already been tested.

SUMMARY

Embodiments of a system and method for organizing rules in a hierarchy and for evaluating and executing the hierarchy of rules are described. Each rule in the hierarchy of rules may include a precondition and an action to be executed if the precondition is met. When evaluating and executing the rules, if a precondition of a rule in the hierarchy is not met (e.g. evaluates to false), then the action of the rule is not executed. In addition, rules that descend from the rule in the hierarchy of rules are precluded from evaluation and execution.

Embodiments may define an inheritance relationship among rules in the hierarchy of rules. The hierarchy of rules may include one or more parent rules each having one or more direct descendents (child rules). At least one of the one or more child rules may be a parent rule to one or more other child rules. The precondition of each child rule may be evaluated only if the precondition of its parent rule is met.

In one embodiment, the hierarchy of rules may be evaluated, for example by a rules engine, to generate an output. In one embodiment, evaluation and execution of the rules may be performed by a code generation application, and the output may include computer-executable code. In one embodiment, the computer-executable code may be a Java application executable within a Java container.

In one embodiment, the rules may be defined as classes of an object-oriented programming language. In one embodiment, the programming language may be Java. In one embodiment, a root rule of the hierarchy of rules may extend from a class of the rules engine and the hierarchy of rules may extend from the root rule. In one embodiment, a rules engine may evaluate the plurality of rules in the hierarchy of rules. In one embodiment, the rules may be implemented as Java classes, and the class of the rules engine may be a Rule class that implements a Java IRule interface.

Embodiments may include a mechanism for a rules engine to determine a hierarchical relationship among a plurality of rules input to the rules engine. In one embodiment, hierarchical relationship information may be included in the rules. This information for a given rule may be used to determine a parent rule and/or one or more child rules of the given rule. In other embodiments where rules are implemented as classes (e.g. Java classes), introspection may be used to determine the hierarchical relationship among the plurality of rules. In one embodiment, a reflection API may be used by a rules engine to perform introspection on a plurality of rules. The hierarchical relationship may be used by the rules engine when evaluating the plurality of rules to determine branches of the hierarchical relationship of the plurality of rules to be evaluated or skipped depending on the results of evaluation of the precondition of a parent rule of the branch. Evaluation of preconditions of rules in the plurality of rules may be performed against data (also referred to as facts) accessed by the rules engine. In one embodiment, the data may be input by a user of an application.

In one embodiment, the hierarchy of rules may be modified. Modifications to the hierarchy of rules may include, but are not limited to, adding rules, deleting rules, moving rules, and modification of preconditions and/or actions of rules. In one embodiment, modification of the hierarchy of rules may be performed without requiring modification to an application or system using the hierarchy of rules.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a system and method for organizing rules in a hierarchy and for evaluating and executing the hierarchy of rules are described. Each rule in the hierarchy of rules may include a precondition and an action to be executed if the precondition is met. When evaluating and executing the rules, if a precondition of a rule in the hierarchy is not met (e.g. evaluates to false), then the action of the rule is not executed. Further, rules that descend from the rule in the hierarchy of rules are precluded from evaluation and execution. In one embodiment, the hierarchy of rules may be modified. Modifications to the hierarchy of rules may include, but are not limited to, adding rules, deleting rules, moving rules, and modification of preconditions and/or actions of rules. In one embodiment, modification of the hierarchy of rules may be performed without requiring modification to an application or system using the hierarchy of rules.

As an exemplary implementation of one embodiment of the system and method for organizing rules in a hierarchy and for evaluating and executing the hierarchy of rules, a hierarchy of rules may be used in a code generation application, e.g. a J2EE application generator. In this exemplary application, the expected output may include Java code and XML and database creation schema, and potentially other application components. Input to the application may specify particulars of the code and other components to be produced as output.

Embodiments may be used in any application that has a rules-based nature. A hierarchy of rules may be modified without requiring modification to the application that implements it. Thus, embodiments may be used in applications that may need to be changed periodically, for example due to new "best practices" and/or patterns; the hierarchy of rules may be modified to reflect the changes in best practices and/or patterns without requiring modification to the application code. Embodiments may also be used in applications that may need to be expanded; for example, in the code generation application described above, the hierarchy of rules 101 may be modified to generate default web service wrappers and/or default user interface front ends.

Figure 1:
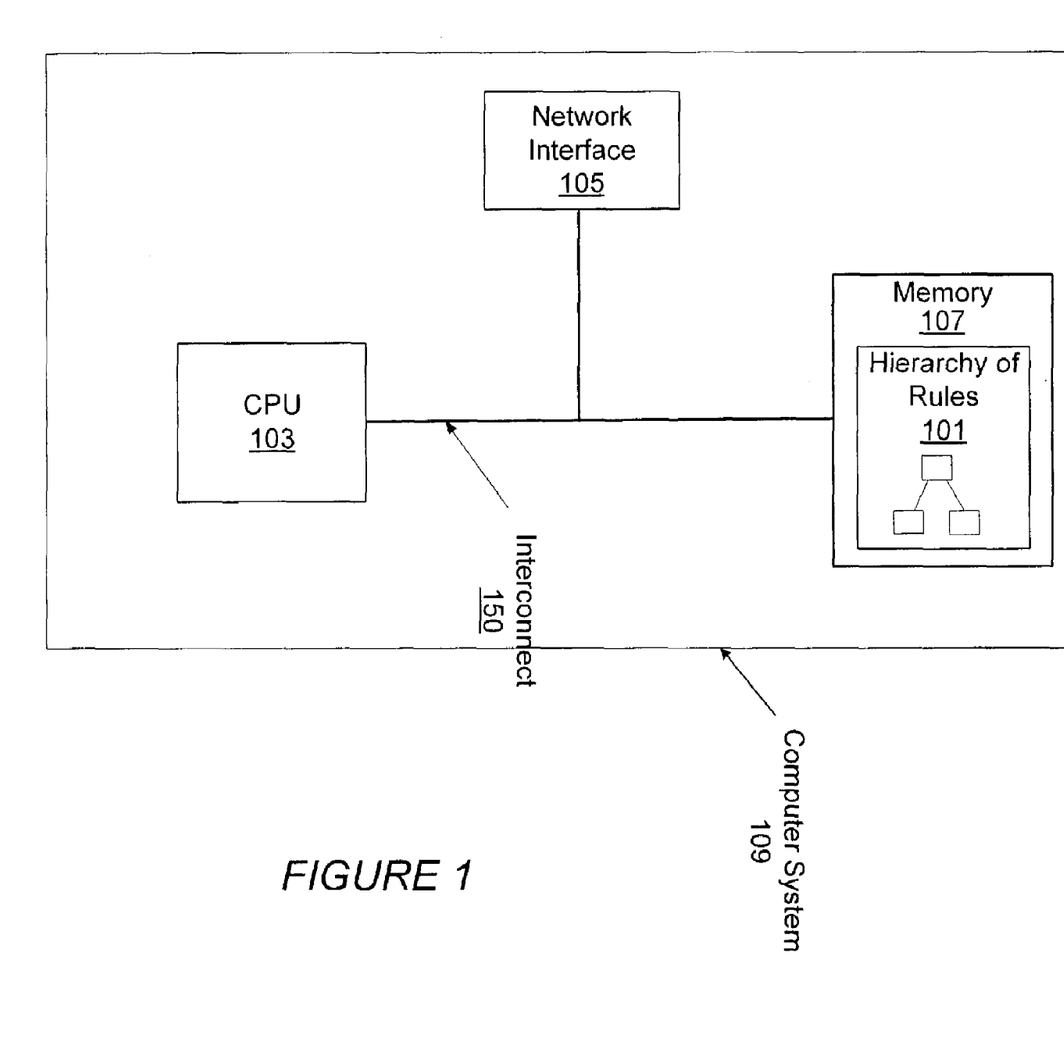
FIG. 1 illustrates a computer system including a hierarchy of rules, according to one embodiment.

FIG. 1 illustrates an exemplary computer system including an exemplary hierarchy of rules, according to one embodiment. Computer system 109 may include, but is not limited to, a central processing unit (CPU) or processor 103, memory 105, a network interface 105 and device interconnect 150. Interconnect 150 may communicate data from one component to another. For example, interconnect 150 may be a point-to-point interconnect, a shared bus, a combination of point-to-point interconnects and one or more buses, and/or a bus hierarchy including a system bus, CPU bus, memory bus and input/output buses such as a peripheral component interconnect (PCI) bus. Memory 107 may store program instructions and/or data accessed by the CPU 103. For example, the hierarchy of rules 101 may be stored in memory 107 and accessed from memory 107 via CPU 103. The computer system 109 may be attached to a network as part of a distributed computing environment via a network interface 105. Some computer systems 109 may include other components such as application software (e.g., stored in memory 107), other processors, video monitors or other displays, track balls, mice, keyboards, printers, plotters, scanners, or other types of input/output devices for use with computer system 109.

In different embodiments, a computer system 109 that includes the hierarchy of rules 101 may take various forms including a personal computer system, desktop computer, notebook computer, workstation, server, mainframe computer system, network appliance, network computer, Internet appliance, personal digital assistant (PDA), embedded device, smart phone, television system, another suitable device, or combinations thereof. In general, the term computer system may be broadly defined to encompass any device having a processor that executes instructions from a computer-accessible medium.

The computer system 109 may be configured to execute one or more computer programs stored on a computer-accessible medium. The hierarchy of rules 101 and/or application software configured to evaluate the hierarchy of rules 101 may be stored on various computer-accessible media. The hierarchy of rules 101 may be read from a computer-accessible medium into memory 107, generated in memory 107 at run-time, or provided to memory from other sources (e.g. from network via network interface 105). Examples of computer-accessible media include hard disk storage, floppy disk storage, removable disk storage, flash memory or random access memory (RAM). Computer-accessible media may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. Computer-accessible media may include other types of memory as well, or combinations thereof. In addition, a computer-accessible medium may be located in a first computer in which the computer programs are executed, or may be located in a second different computer. The second computer may connect to the first computer, for example over a network, through one or more components such as network interface 105. In the latter instance, the second computer may provide the program instructions to the first computer via the network for execution.

Requirements or conditions for various operations may be modeled and included in the hierarchy of rules 101. For example, automated processes (e.g., actions, command sequences, etc.) provided by an application may be modeled and included in the hierarchy of rules 101. Each rule in the hierarchy of rules 101 may represent the requirements or conditions needed for performing a particular automated process of the application. Each rule may test whether the requirements or conditions are met before the particular automated process is performed.

Each rule in the hierarchy of rules 101 may include a precondition and an action to be executed if the precondition is met. When evaluating and executing the rules, if a precondition of a rule in the hierarchy is not met (e.g. evaluates to false), then the action of the rule is not executed. Further, rules that descend from the rule in the hierarchy of rules 101 are precluded from evaluation and execution.

Figure 2:
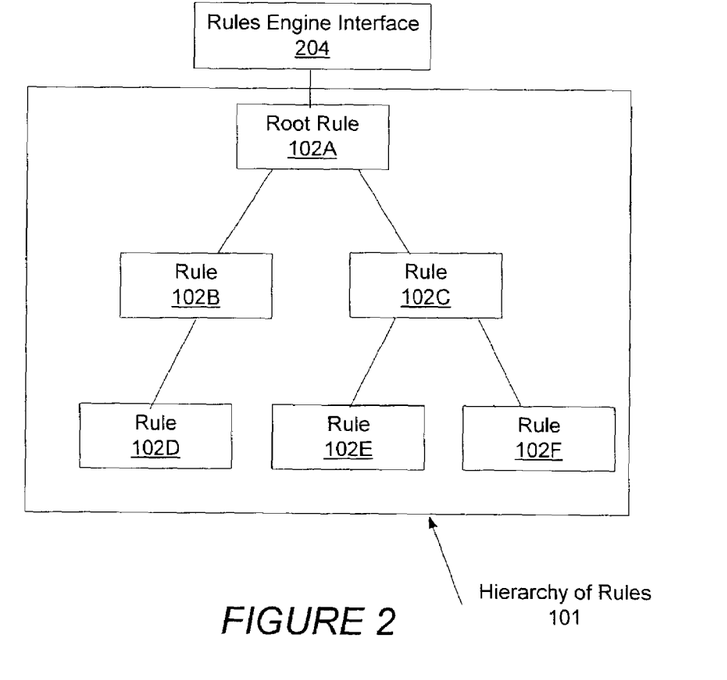
FIG. 2 illustrates an exemplary hierarchy of rules, according to one embodiment.

FIG. 2 illustrates an exemplary hierarchy of rules 101, according to one embodiment. The hierarchy of rules 101 may include a root rule 102A as a top-most rule of the hierarchy of rules 101. Each of the rules 102 within the hierarchy of rules 101 may be a parent rule of one or more child rules and/or a child rule of a parent rule. In this example, the root rule 102A is a parent rule of child rules 102B and 102C. Rules 102B and 102C may also be parent rules of other rules. Thus, the hierarchy of rules 101 may include one or more intermediate levels of rules 102. In an intermediate level, at least one of the rules of the intermediate level has at least one child rule. Child rules of a parent rule may be referred to as descendants of the parent rule. A branch of the hierarchy of rules 101 may include a rule and all rules descending from the rule. The topmost rule in the branch may be referred to as the parent rule of the branch. Each rule 102 of the hierarchy of rules 101 with no child rules may be referred to as a leaf rule.

The hierarchy of rules 101 may be configured differently than shown in FIG. 2. For example, the hierarchy of rules 101 may be a binary tree (e.g., at most two child rules for each parent rule), a tertiary tree (e.g., at most three child rules for each parent rule) or a multiway tree (e.g., any number of child rules 102F for each parent rule).

Each of the rules 102 may include a precondition and an action configured to be executed if the precondition is met. The precondition may represent the requirements or conditions for performing a particular action. The precondition may define qualitative (e.g., categorical such as names of cars) and/or quantitative (e.g., numeric such as a number of cars) conditions. The action may represent the outcome (e.g., send an email, create new variable) when the precondition is satisfied. For example, the action may prevent, cause or recommend further outcomes based on whether the precondition is met.

In one embodiment, the hierarchy of rules 101 may be configured for evaluation by a rules engine. In one embodiment, a rules engine interface 204 may serve as an interface between the rules engine and the hierarchy of rules 101 for evaluation of the rules 102. A rules engine may evaluate preconditions of rules 102 within the hierarchy of rules 101 to determine if requirements or conditions for the rules have been met. If a precondition of a rule in the hierarchy is not met (e.g. evaluates to false), then the action of the rule is not executed. Further, rules that descend from the rule in the hierarchy of rules 101 are precluded from evaluation and execution by the rules engine.

In various embodiments, the hierarchy of rules 101 may be a collection of rules 102 such as a rule set, rule execution set or some other set of rules organized as a hierarchy of rules. Various types of rules 102 may be included in the hierarchy of rules 101 including one or more of, but not limited to, deduction, inference, derivation, reaction or other types of rules. For example, a deduction, inference or derivation rule 102 may be configured to derive information from existing data or other derived information as needed. An example of a derivation rule 102 is: "the rental rate of a rental car is inferred from the rental rate of the type of car assigned to the rental car". Reaction rules 102 may be configured to determine if an event has occurred and recommend possible actions based on information obtained as a result of the event. The action of a reaction rule 102 may be executed in response to the event. An example of a reaction rule 102 is: "when receiving the request to reserve a car of some specified car type, the current status of the specified car type is checked".

In one embodiment, each rule 102 of the hierarchy of rules 101 may be implemented as an object class of an object-oriented programming language. The object classes may implement the particular preconditions and actions for each rule. In one embodiment, the object-oriented programming language may be Java. In one embodiment, each rule 102 may be implemented as an object class, and each object class may be configured with access to a rules engine via rules engine interface 204. The hierarchy of rules 101 may be stored in a repository in compiled form or some other format configured for execution. In one embodiment, Java object classes (e.g., a class for each rule 102) may be configured as Java class files and packaged as part of a Java rules-based application. In one embodiment, rules 102 may be developed and/or generated with a rules authoring tool (e.g., a builder tool via a graphical user interface).

In another embodiment, the hierarchy of rules 101 may be configured by embedding rules 102 in triggers and/or stored procedures developed with a structured query language (SQL). For example, SQL may be provided by a relational database management system (e.g., Oracle® RDMS from Oracle Corporation) and SQL-based triggers may be used to implement the hierarchy of rules 101. In other embodiments, object tables of an object-relational database (ORDB), object classes of a bean framework (e.g., Enterprise Java-Beans™) or other types of technologies may be used to configure the hierarchy of rules 101. For example, the hierarchy of rules 101 may be implemented with rules markup language (RuleML), extensible rule markup language (XRML), business rules markup language (BRML), artificial intelligence markup language (AIML) or some other markup language.

Figure 3:
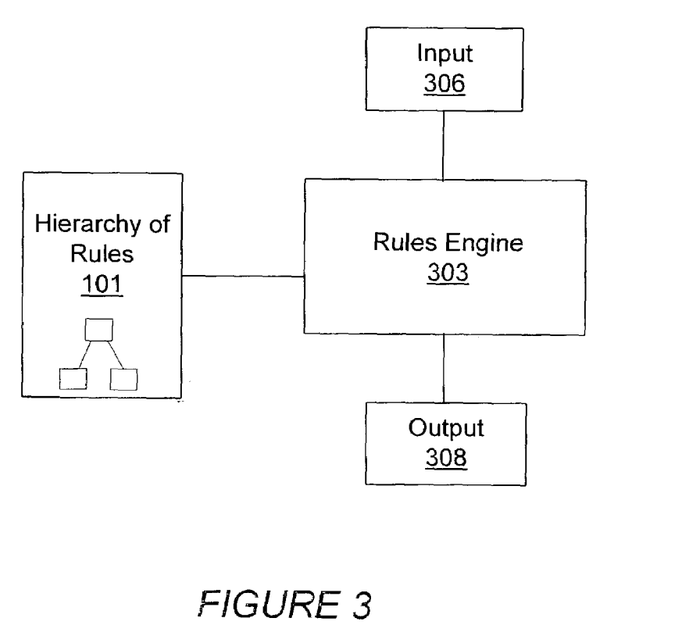
FIG. 3 illustrates evaluation of a hierarchy of rules by a rules engine, according to one embodiment.

FIG. 3 illustrates a hierarchy of rules 101 accessible to a rules engine 303, according to one embodiment. The hierarchy of rules 101 may be configured for evaluation by a rules engine 303. The hierarchy of rules 101 may be evaluated against input 306 resulting in output 308. The hierarchy of rules 101 may be loaded for evaluation (e.g., dynamically loaded into memory at run-time) by rules engine 303 and the preconditions of the loaded rules may be evaluated. In one embodiment, the precondition of child rules of a parent rule may be evaluated only if the precondition of the parent rule is met. Evaluating the precondition of a parent rule before evaluating preconditions of child rules provides an evaluation link between the parent rule and the one or more descendant rules of the parent rule. For example, results of the precondition of a parent rule may preclude the actions of the parent rule from being executed and the preconditions and actions of descendant rules of the parent rule from being evaluated and executed. Consequently, a branch of the hierarchy of rules 101 may be evaluated only if the precondition of the parent rule for that branch is met. If the precondition of the parent rule for that branch is not met, the branch and descendant rules of the branch may be ignored during evaluation. In one embodiment, ignoring one or more branches of the hierarchy of rules 101 if the precondition of a topmost rule in the branch is not met may decrease the number of rules evaluated in a given evaluation cycle. In one embodiment, the particular action of a rule may be an "empty action" configured to simply continue evaluation of other rules if the precondition of the rule is met.

The input 306 may include information (e.g., a collection of facts, variable-free tuples, etc.) used by the hierarchy of rules 101 during evaluation. One or more relationships may be expressed within the information. For example, data that depends on other data (e.g., data inferred from existing data) may be needed to evaluate a precondition of a rule. Examples of input 306 for a quantitative precondition may be "are-four cars maximum" and "are-five cars minimum." An example of input 306 for a qualitative precondition may be "is-a auto car" which expresses the fact that "the auto is a car." Another example of input 306 for a qualitative precondition may be "has-types-of auto car truck cycle" which expresses the fact that "the auto has types of car, truck and cycle."

In various embodiments, rules engine 303 may be a rules-based application, an inference engine, an expert system including a rules engine 303, an event management system or some other software configured to access and evaluate the hierarchy of rules 101. An evaluation cycle may include evaluation of a portion or all of hierarchy of rules 101. The rules engine 303 may use different methods to evaluate the hierarchy of rules 101. For example, the rules engine 303 may use forward-chaining, backward-chaining or some other semantic for evaluation of the rules.

Note that each rule, if the precondition of the rule is met, may produce output 308. The output 308 of the rule may include information and/or other actions resulting from performing the action of the rule. The output 308 of a rule from a rules engine 303 may be determined by the input 306 to the rule and may include the original input 306 with possible modifications, additional input 306 and/or some other action (e.g., send an email, create new output) as a result of performing the specified action of the rule. The action of the rule may represent the outcome (e.g., send an email, create new output) when the precondition of the rule is satisfied. At least a portion of output 308 of a rule may be input to one or more child rules of the rule. In addition to the output of each individual rule in the hierarchy of rules 101, evaluating the preconditions and performing the actions of all the rules in the hierarchy of rules 101 for which the preconditions are met may produce output 308 of the hierarchy of rules 101.

As an exemplary implementation, a hierarchy of rules 101 may be configured for use in an application for drawing various figures based upon input 306 including specifications for the figure. Evaluating the input 306 against the hierarchy of rules 101 may produce output 308 (e.g. a particular figure as specified by the input 306). As another example, a hierarchy of rules 101 may be used in a code generation application, e.g. a J2EE application generator. In this exemplary application, the expected output 308 may include Java code and XML and database creation schema, and potentially other application components. Input 306 to the application may specify particulars of the code and other components to be produced as output 308.

Figure 11:
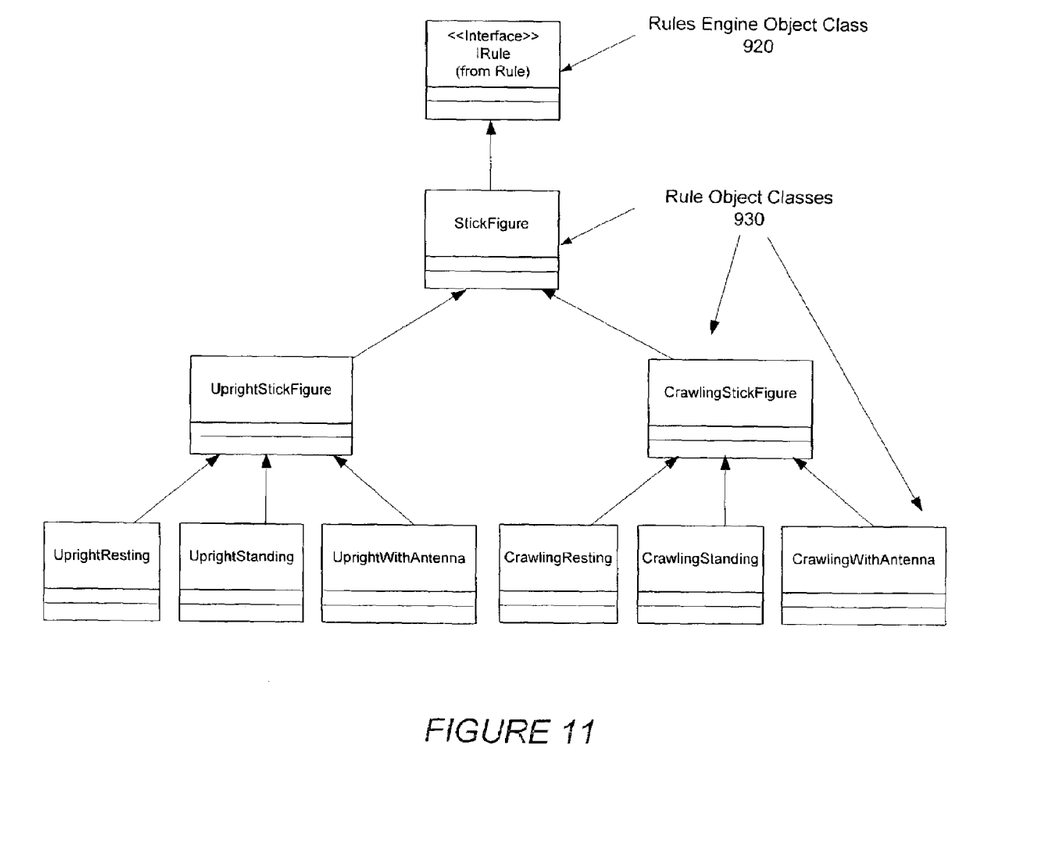
FIG. 11 illustrates a class diagram of a hierarchy of rules for an exemplary application, according to one embodiment.

The hierarchy of rules 101 may define an inheritance relationship between a parent rule and descendant rules of the parent rule. In an object-oriented language such as Java™, an inheritance relationship between classes satisfies a generalization-specification relationship. As an example, consider the classes Mammal and Human. Mammal is a generalization of Human; therefore, it is the parent class. Human is a specification of Mammal; therefore, it is the child class. In one embodiment, rules may be implemented as Java classes, and hierarchy relationships of the rules are implemented as inheritance relationships. In this embodiment, in addition to the hierarchy relationship represented by an inheritance relationship, the generalization-specification nature of inheritance relationship is also maintained. As an example, the StickFigure rule and the UprightStickFigure rule as illustrated in FIG. 11 are joined by an inheritance relationship. Therefore, the rules also have a generalization-specification relationship.

When evaluating the hierarchy of rules, the rules engine 303 may need information indicating child rules, if any, of a rule being evaluated so that the rules engine 303 can evaluate the preconditions of the child rules if the precondition of the rule being evaluated is met. This information may be referred to as the hierarchical relationship of the rules in the hierarchy of rules 101. This hierarchical relationship information may also be used by the rules engine 303 to determine which rules to skip (i.e. ignore or not evaluate) if the precondition of a particular rule is not met. Embodiments may provide a mechanism for the rules engine 303 to determine the hierarchical relationship among the rules.

In one embodiment, hierarchical relationship information may be included in the rules themselves. A parent rule may include an indication (e.g. a reference, a name, a pointer, etc.) of its one or more child rules. If the precondition of the parent rule is not met, the rules engine 303 may access this information, if necessary, to "ignore" the child rules (and thus the entire branch of the hierarchy of rules 101 beginning at the parent rule.) If the precondition of the parent rule is met, the rules engine 303 may access this information to continue evaluation of the branch at the indicated one or more child rules of the parent rule.

In another embodiment, a parent rule may not include indications of what rules descend from the parent rule. In general, using object classes (e.g. Java object classes), a class includes no indication of other classes derived from it. In this embodiment, the rules engine 303 may use introspection to determine the hierarchical relationship among the rules. Introspection may be defined as a process of inspecting classes for meta-information about the classes. Introspection may be performed statically or dynamically. In static introspection, the "raw" class data (e.g. in a file) may be inspected to determine how classes in the class data are defined. In dynamic introspection, classes are inspected after being loaded. Thus, some embodiments of a rules engine 303 may use static introspection to determine a hierarchical relationship for a hierarchy of rules 101 to be evaluated before loading the rules. Other embodiments may use dynamic introspection to determine a hierarchical relationship for a hierarchy of rules 101 to be evaluated after loading the rules. In some embodiments, dynamic introspection (static or dynamic) may be used on a rule only if necessary. In this embodiment, for example, the root rule may be evaluated and, if the precondition of the root rule is met, introspection may be used to determine child rules of the root rule. Introspection may then be used on each child rule if the precondition of the child rule is met to determine child rules, if any of the child rule.

In one embodiment, a reflection application programming interface (API) may be used by a rules engine 303 to dynamically build the hierarchy of rules 101 for evaluation. A reflection API is an introspection facility for object classes. In one embodiment implemented with Java classes, the Java Reflection API may be used. In one embodiment, the reflection API may be called when an object (e.g., a root rule) extending from the rules engine 303 is instantiated. Instantiation of the object may build that instance of the object into a hierarchy of rules 101 with a root rule. The reflection API may be used to determine the hierarchical relationship among the rules, and thus to determine which rules in the hierarchy are to be evaluated or not evaluated based on the results of the outcome of the evaluation of the precondition of rules in the hierarchy of rules.

Note that other embodiments may use other methods to determine a hierarchical relationship among a plurality of rules.

In some embodiments, when determining the hierarchical relationship among the rules in the hierarchy of rules, the rules engine 303 may generate a representation of the hierarchical relationship. This representation may be in memory or alternatively may be written into a file. This representation may, for example, include pointers, names, references or other indications of rules and their relationships with other rules in the hierarchy. The rules engine 303 may then use this representation when evaluating the hierarchy of rules 101

In one embodiment, the classes may be implemented as Java classes, and the hierarchy of rules 101 may extend from a Rule object class of the rules engine 303 that implements a Java IRule interface. The IRule interface may provide an interface or contract between a class and the user of the class. The IRule interface may be considered as the definition of a rule seen by its user. The rules engine may be the user of these rule classes. In this embodiment, since an application may include many rules and therefore many Java rule classes, for each of these classes to be considered a rule in the application, the class may implement the IRule interface. In one embodiment, the rule hierarchy relationships may be expressed as inheritance relationships between the rule classes. In this embodiment, the root rule (or the parent of the root rule) may implement the IRule interface. Since in this embodiment rules inherit properties of their parent rules, all child rules of the root rule (i.e. all other rules in the hierarchy of rules) inherit the IRule interface. Therefore, in this embodiment, the IRule interface may not be directly implemented by all of the rule classes. In one embodiment, the rules engine 303 may be implemented by the Rule object class and the root rule of the hierarchy of rules 101 may extend from the rules engine 303.

In one embodiment, the hierarchy of rules 101 may be external to the rules engine 303 and loaded into the rules engine 303 for evaluation. For example, the hierarchy of rules 101 may be configured as part of an application or may be in a file external to the rules engine 303 and accessed by the rules engine 303 via a rules engine interface. In one embodiment, a rules engine 303 may be a lightweight engine that may load and evaluate the rules 101, and then delegate interpretation and execution of the output 308 to the application external to the rules engine 303. In other embodiments, interpretation and execution of the output 308 may be executed directly by the rules engine 303.

In one embodiment, the hierarchy of rules 101 for an evaluation cycle may be selected based on current input 306 in memory. For example, a rule may be ready for evaluation if the rule has a precondition that matches the input 306 in memory. In one embodiment, pattern matching may be used to identify a common pattern between an input 306 and a rule. For example, inputs 306 may be matched to the hierarchy of rules 101 (e.g., search until a common pattern between an input and a rule is identified) to select rules for evaluation. The precondition may include a pattern that serves as a guide for determining if the precondition should be evaluated against the input 306. An example of a precondition of a rule is "(is-a auto ?X)" which matches the fact that "is-a auto car". In other embodiments, a different approach (e.g., an algorithm) may be used to determine if preconditions of rules within the hierarchy of rules 101 are candidates for evaluation.

An evaluation cycle may end for various reasons. An evaluation cycle may stop, for example, when no more rules can be matched with input 306, when all rules in the hierarchy have been evaluated or skipped, or when the rules engine detects that additional input 306 has not changed from a previous evaluation cycle. As another example, an action of a rule may be configured to stop the evaluation cycle. As yet another example, evaluation may stop if an application external to the rules engine aborts evaluation of the rules. In one embodiment, if the action of a rule executes, then additional input 306 may be added to memory for evaluation and the added input 306 may be used to match more rules until an evaluation cycle ends.

An execution context may exist for each evaluation cycle of a rules engine 303. For example, more than one evaluation cycle may execute concurrently and share the same rules. In one embodiment, the preconditions of one or more descendant rules may be met, and thus more than one branch may be evaluated in the same evaluation cycle. For example, independent parent rules (e.g., child rules with the same parent rule) and descendant rules of each of the independent parent rules may be evaluated during the same evaluation cycle.

Figure 4:
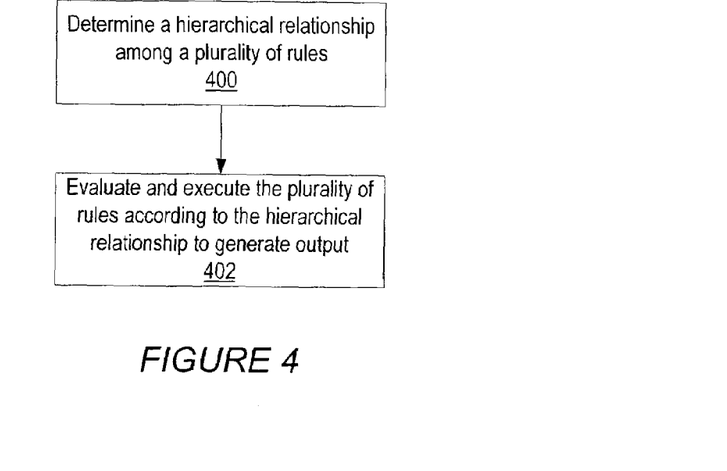
FIG. 4 is a flowchart illustrating evaluating and executing a plurality of rules to generate output according to one embodiment.

FIG. 4 is a flowchart illustrating evaluating and executing a plurality of rules to generate output according to one embodiment. As indicated at 400, a hierarchical relationship among a plurality of rules may be determined. Each of the plurality of rules may include a precondition and an action to be executed if the precondition is met. In one embodiment, the rules may be implemented as classes in an object-oriented programming language (e.g. Java), and the hierarchical relationship may be determined using introspection. In one embodiment, a reflection API may be accessed to perform the introspection. Other embodiments may use other mechanisms to determine the hierarchical relationship. For example, in one embodiment, relationship information may be included in the rules. For In this embodiment, for example, a rule may include information indicating the rule's parent and/or one or more child rules. As indicated at 402, the plurality of rules may be evaluated and executed according to the hierarchical relationship to generate output. The hierarchical relationship may be used, for example, in determining branches of the plurality of rules according to the hierarchical relationship to be evaluated or not evaluated depending on the results of evaluation of the preconditions of particular rules in the plurality of rules.

In one embodiment, the method illustrated in FIG. 4 may be implemented in a computer application that accepts data input, evaluates preconditions of the plurality of rules against the data input, and generates output of evaluation and execution of the plurality of rules as specified by the data input. In one embodiment, the application may be a code generation application that generates computer-executable code as output. Other embodiments may generate other types of output.

Figure 5:
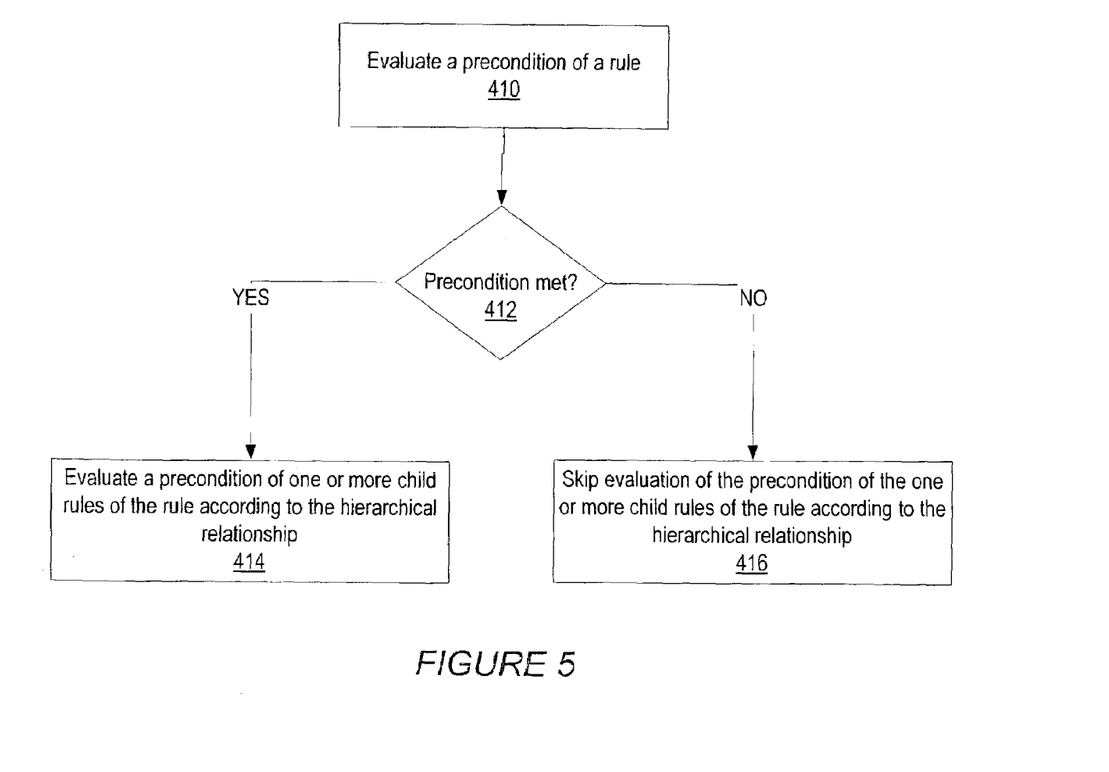
FIG. 5 is a flowchart illustrating evaluating a rule of the plurality of rules according to one embodiment.

FIG. 5 is a flowchart illustrating evaluating a rule of the plurality of rules according to one embodiment and further describes 402 of FIG. 4. In evaluating and executing a plurality of rules according to a hierarchical relationship, a precondition of a rule may be evaluated as indicated at 410. As indicated at 412, if the precondition of the rule is met, the precondition of one or more child rules of the rule according to the determined hierarchical relationship may be evaluated as indicated at 414. If the precondition of the rule is not met, evaluation of the precondition of the one or more child rules of the rule may be skipped.

Figure 6:
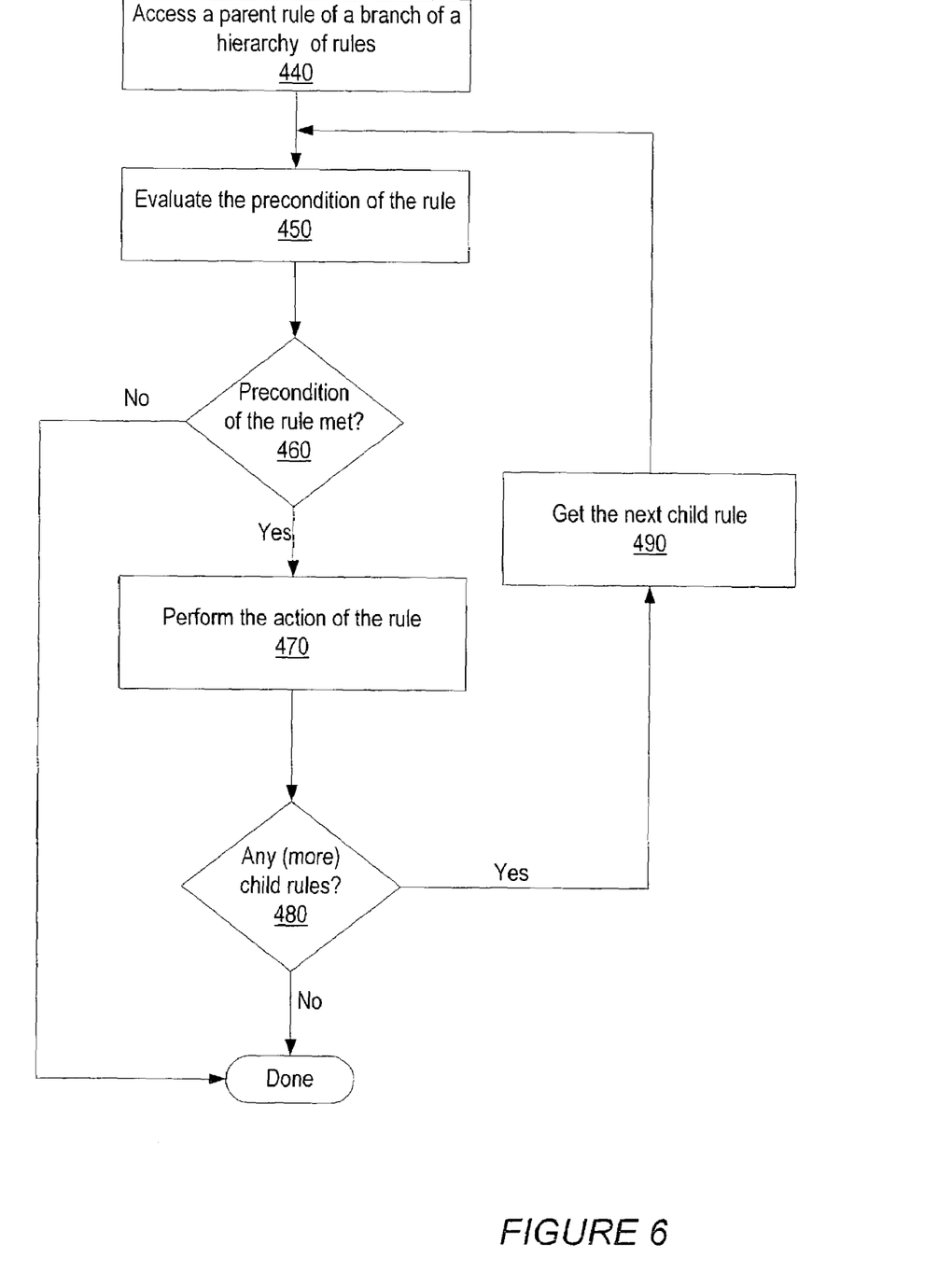
FIG. 6 is a flowchart of a method for evaluating a hierarchy of rules according to one embodiment.

FIG. 6 is a flowchart of an exemplary method for evaluating a hierarchy of rules, according to one embodiment. Depending on a rule's position within the hierarchy, each of the rules may be a parent, a child, a branch, a descendent and/or a leaf. The hierarchy of rules may include a root rule as a top-most rule of the hierarchy, as illustrated in FIG. 2. Each of the rules in the hierarchy of rules may include a precondition and an action to be executed if the precondition is met. Preconditions of the hierarchy of rules may be evaluated against input to the application. Embodiments of this method may be implemented in any of a variety of rules-based applications. As an example, this method may be implemented in a code generation application.

A rules engine may access a parent rule of a branch of a hierarchy of rules, as indicated at 440. In one embodiment, rules for a given evaluation cycle may be loaded into the rules engine for evaluation, as illustrated in FIG. 3. The precondition of the parent rule may be evaluated as indicated at 450. As indicated at 460, if the precondition of the rule is met, then the action of the rule may be performed, as indicated at 470. In one embodiment, if the action of the rule is executed, additional input may be added to memory and the added input may be used to evaluate descendent rules. As indicated at 460, if the precondition of the rule is not met, then evaluation of this branch of the hierarchy of rules may be done.

As indicated at 480, if there are child rules of the parent rule to be evaluated, then a next child rule may be determined as indicated at 490 and the process may return to 450 to evaluate the precondition of the child rule. Note that the child rule may be considered a parent rule of a branch of the hierarchy of rules starting at the child rule. If there are no more child rules to be evaluated, then evaluation of this branch of the hierarchy of rules may be done. In one embodiment using evaluation cycles, if there are no more rules to be evaluated in this evaluation cycle, then the evaluation cycle has been completed and a new execution cycle may begin, if necessary (e.g. if there are more rules to be evaluated).

Using the method of FIG. 6, the precondition of each descendant rule of a parent rule may be evaluated only if the precondition of the parent rule is met. Evaluating the precondition of a parent rule before evaluating the precondition of each child rule may preclude the action of the parent rule and descendant rules of the parent rule from being executed if the precondition of the parent rule is not met. Consequently, each branch of the hierarchy of rules may be evaluated only if the precondition of the parent rule for that branch is met. If the precondition of the parent rule of the branch is not met, the branch and child rules of the branch may be ignored during evaluation.

When the evaluation of the hierarchy of rules is complete, then output of evaluation and execution of the hierarchy of rules may be generated. For example, in a code generation application, an application and its components as specified by the input may be output. As another example, in figure drawing application, a figure as specified by the input may be produced (e.g. drawn on a display screen, dumped to a file, or printed a printer).

The hierarchy of rules may be modified to reflect changes made to rules within the hierarchy of rules. In one embodiment, the hierarchy of rules may be modified without requiring modification to an application implementing the hierarchy of rules. Modifications to the hierarchy of rules may include one or more of, but are not limited to, adding a new rule to the hierarchy, removing an existing rule from the hierarchy, modifying a precondition or action of a rule, or some other change that may modify the inheritance relationship among the rules. In one embodiment, rules may be modified at run-time. In some embodiments, the hierarchy of rules may be modified with a rules authoring tool. Rules may be modified within intermediate levels of the hierarchy of rules by changing, if necessary, an inheritance relationship of each child rule of the modified rule. In one embodiment, the inheritance relationship of each child rule implemented as an object class of the modified object class may be redefined to reflect the modification made to the hierarchy of rules. Leaf rules may be added to or deleted from the hierarchy of rules without modification to other rules within the hierarchy of rules.

Figure 7:
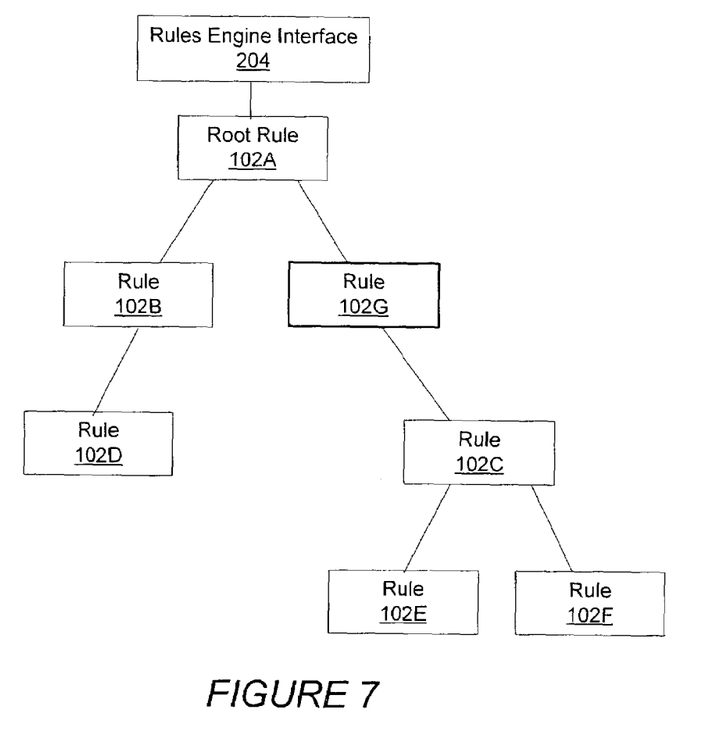
FIG. 7 illustrates adding a rule to a hierarchy of rules, according to one embodiment.

FIG. 7 illustrates adding a rule 102G to the exemplary hierarchy of rules as illustrated in FIG. 2, according to one embodiment. In this example, a rule 102G is added between rules 102A and 102C. A reference of child rule 102C to parent rule 102A may be changed to indicate the new inheritance relationship of child rule 102C to parent rule 102G. Rule 102C may be added as a child rule of parent rule 102G. Rule 102G may be added as a child rule of parent rule 102A. In one embodiment, modifying the reference may include changing object class 102C to indicate that object class rule 102C now extends from object class rule 102G.

Figure 8:
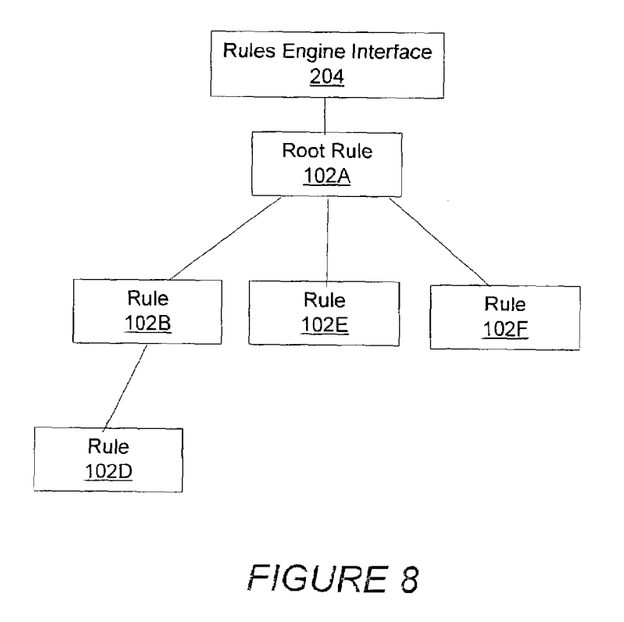
FIG. 8 illustrates removing a rule from a hierarchy of rules, according to one embodiment.

FIG. 8 illustrates removing a rule 102C from the exemplary hierarchy of rules as illustrated in FIG. 2, according to one embodiment. In this example, rule 102C has been removed between its parent rule 102A and its child rules 102E and 102F. Rules 102E and 102F were child rules of the removed parent rule 102C. The references of rules 102E and 102F may be changed to indicate that rules 102E and 102F are now child rules of parent rule 102A.

In one embodiment, redefining the inheritance relationship between rules may include executing a refresh mechanism to rebuild the hierarchy of rules after a modification. For example, a refresh trigger may be executed at different intervals to detect if rules have been added and/or removed from the hierarchy of rules. The hierarchy of rules may then be rebuilt to reflect the changes. In some embodiments, rules with new inheritance relationships within the hierarchy of rules may be rebuilt.

Figure 9:
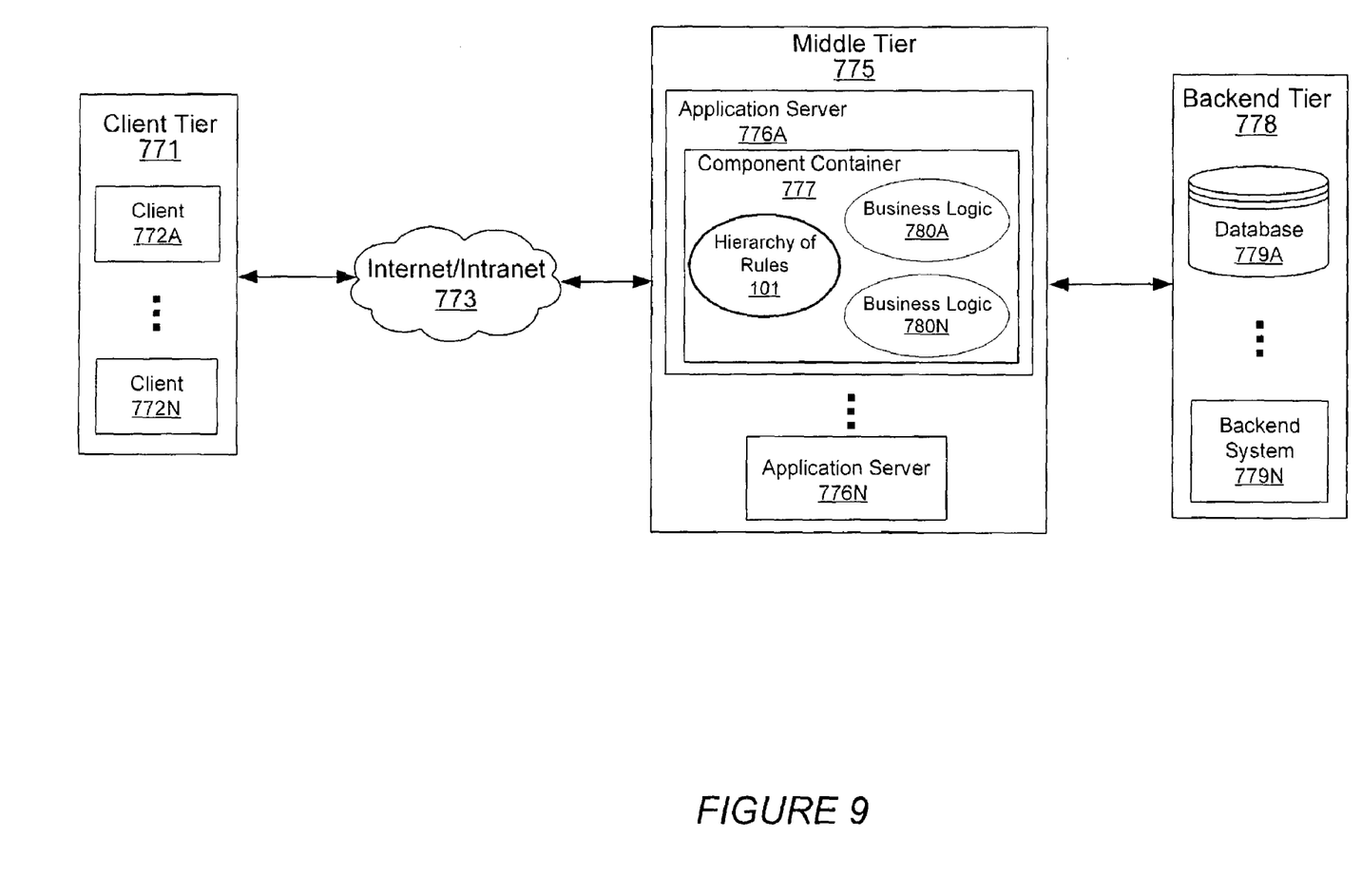
FIG. 9 illustrates an exemplary computer system including a hierarchy of rules, according to one embodiment.

FIG. 9 illustrates an exemplary computer system including a hierarchy of rules 101, according to one embodiment.

The exemplary computer system is based on a three-tier architecture. Application logic of the computer system may be divided into application components (e.g., applets, business logic 780, application clients 772, database objects, etc.) according to function and the various application components may be installed on different computers depending on factors such as security and load distribution. Tiers (e.g., client tier 771, middle tier 775, backend tier 778) may represent the logical or physical organization of the application components that may operate across one or more different computers. The different computers may be based on different platforms and architectures. In other embodiments, the application components of the computer system may be based on a two-tier architecture, an N-tier architecture or even on a single computer system. Thus, the application components of a computer system based on the three-tier architecture of FIG. 9 illustrate only one example of a computer system suitable for implementing various embodiments.

Client tier 771 may include a number of different clients 772A through 772N (e.g., device, system, user interface) communicating with business logic components 780 (e.g., servlets, server pages, beans) in the middle tier 775 via the Internet/Intranet 773. In one embodiment, a client 772 may be configured as a rules authoring tool to build, modify and/or manage the hierarchy of rules 101. A client 772 may also provide interactive access for entering input used by the system. For example, a client 772 may include a Web browser (e.g., Internet Explorer) and facts for input into a rules engine may be collected via the Web browser.

The middle tier 775 may include a number of different application servers 776A through 776N. Some of the application components operating within the middle tier 775 may be configured to run within a component container 777 included in application server 776A. Some standard services (e.g., security, transaction management, state management, multi-threading) may be built into a platform and provided automatically to the application components via the container 777 and/or application server 776A. The backend tier 778 may include a number of different systems such as database 779A through backend system 779N. Application components may communicate with other application components using different types of protocols such as Hyper Text Transfer Protocol Secure sockets (HTTPS), Java™ Database Connectivity (JDBC), eXtensible Markup Language (XML) and/or Simple Object Access Protocol (SOAP), among others.

Application logic of the computer system may be configured to include the hierarchy of rules 101 and business logic components 780A through 780N. The computer system may implement a rules-based system including a rules engine. In one embodiment, object classes may be configured as class files and packaged with business logic components 780 as part of the rules-based system. In one embodiment, the rules engine may be configured as a rules engine server running within component container 777. In one embodiment, the application may be implemented with Java™ 2 Platform, Enterprise Edition (J2EE™) with the business logic components 780 configured as Enterprise JavaBeans (EJBs). The class files may be loaded by a virtual machine such as Java Virtual Machine (JVM).

The business logic components 780 and the hierarchy of rules 101 may be accessed during evaluation and execution of the hierarchy of rules. For example, the rules engine may invoke program methods of the business logic components 780 and access data (e.g., a collection of facts) provided by the business logic components 780. An inheritance relationship among the rules may provide a modular architecture for maintaining rules of the application. The hierarchy of rules 101 may be modified without changing the application. Rules may be removed and/or added to the hierarchy of rules 101 with limited or no effect on other rules.

Figure 10:
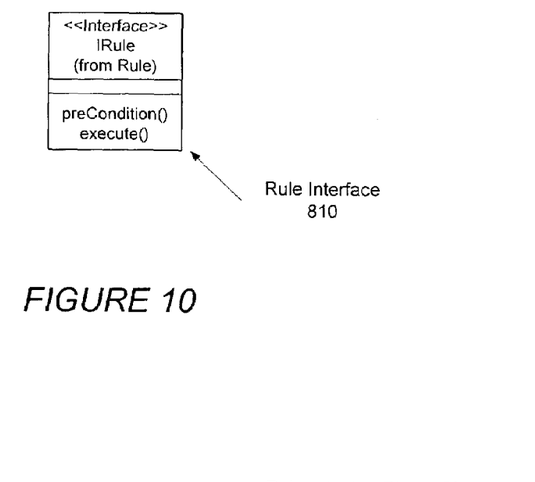
FIG. 10 illustrates a rule interface of a rules engine, according to one embodiment.

FIG. 10 illustrates an exemplary rule interface 810 provided by a rules engine, according to one embodiment. In one embodiment, each rule within a hierarchy of rules may be defined using the rule interface 810. In one embodiment, the rules may be implemented as Java classes, and may extend from a Rule object class of the rules engine that implements a Java IRule interface. The IRule interface may provide an interface or contract between a class and the user of the class. The IRule interface may be considered as the definition of a rule seen by its user (e.g. the rules engine). In one embodiment, child rules of the root rules may inherit the IRule interface implemented by the root rule. A class implementing this rule interface 810 may be configured to provide the application logic for a precondition and action of a particular rule.

FIG. 11 illustrates a class diagram of a hierarchy of rules for an exemplary stick figure drawing application, according to one embodiment. Each rule within the hierarchy of rules may be implemented as a rule object class 930. A root rule (StickFigure) of the rule object classes 930 may be configured to extend from the rules engine object class 920. In one embodiment, the root rule may implement an IRule interface. Each child rule (UprightStickFigure and CrawlingStickFigure) of the root rule of the rule object classes 930 may be configured to extend from the root rule. Each child rule may be configured to extend from a parent rule to form an inheritance relationship among the rule object classes 930.

The exemplary application may be configured to draw stick figures based on information collected by the application. The information may include inputs received interactively. For example, input may be entered via a Web browser and provided to the application as a collection of facts. The facts may include data such as age of a user, stick figure walking habit (upright, crawl), pose (resting, standing) and other options such as antenna. In one embodiment, a single object may be configured to store the collection of facts.

The following is exemplary rule definition pseudocode for the stick figure application, and is not intended to be limiting:

Stick Figure:
precondition: authenticate user by confirming user age <5
execution: open new drawing file
UprightStickFigure:
precondition: if user has chosen the upright walking habit for the figure
execution: draw stick figure's head and body connected by neck vertically
UprightResting:
precondition: if user has chosen the resting pose for the figure
execution: add two stick hands and two stick legs to body for sitting position
UprightStanding:
precondition: if user has chosen the standing pose for the figure
execution: add two stick hands and two stick legs to body for standing position
UprightWithAntenna:
precondition: if user has chosen the antenna option for the figure execution: print message "up right walking figures do not have antennas"
CrawlingStickFigure:
precondition: if user has chosen the crawling habit for the figure
execution: draw stick figure with connected head and body without neck horizontally
CrawlingResting:
precondition: if user has chosen the resting pose for the figure
execution: add six stick legs to body for resting position
CrawlingStanding:
precondition: if user has chosen the standing pose for the figure
execution: add six stick legs to body for standing position
CrawlingWithAntenna:
precondition: if user has chosen the antenna option for the figure
execution: add antennas to head As illustrated in FIG. 2, rules for an evaluation cycle may be loaded into a rules engine of the stick figure application. Thus, a portion or all of the above rules may be loaded into the rules engine. As an example, the input received via the Web browser may include "10, upright, standing and antenna". The preconditions of the loaded rules may then be evaluated. The StickFigure rule is evaluated as the first rule of the loaded rules. The precondition of each child rule of a parent rule may be evaluated only if the precondition of the parent rule is met. Consequently, based on the exemplary collected facts, the precondition of the StickFigure rule is not met and child rules of the StickFigure rule are precluded from being evaluated. In addition, the action of the StickFigure rule is not executed. The evaluation cycle stops since no other rules are available for evaluation.

As another example, the input received via the Web browser may include "3, upright and standing". UprightUprightThe preconditions of the loaded rules may then be evaluated. The StickFigure rule may then be evaluated as the first rule of the loaded rules. Upon evaluation, the precondition of the StickFigure rule is met since 3 is less than 5. Consequently, the action of the StickFigure rule may be performed; for example, a new drawing file may be opened. Child rules Uprightof the StickFigure rule (CrawlingStickFigure and UprightStickFigure) may then be evaluated. Upon evaluation, the precondition of the CrawlingStickFigure rule is not met since the upright walking habit for the figure was specified. The action of the CrawlingStickFigure rule is not performed, and all rules descending from CrawlingStickFigure are not evaluated. The precondition of the UprightStickFigure rule is met since the upright walking habit for the figure was specified. Consequently, the action of the UprightStickFigure rule may be performed; for example, the stick figure's head and body connected by the neck vertically may be drawn. Child rules Uprightof the UprightStickFigure rule (UprightResting, UprightStanding, and UprightWithAntenna) are evaluated. Upon evaluation, the preconditions of the UprightResting and UprightWithAntenna rule are not met since the standing pose for the figure was chosen. Consequently, actions of the UprightResting and UprightWithAntenna rules are not performed. Upon evaluation, the precondition of the UprightStanding rule is met since the standing pose for the figure was specified. Evaluation stops since no other rules are available for evaluation. The action of the UprightStanding rule may be performed; for example, the stick figure may be drawn in an upright standing position. Although not described in this example, the preconditions of one or more child rules may be met, and thus more than one branch of a hierarchy of rules may be evaluated.

The hierarchy of rules for the stick figure application may be modified. For example, the application may be extended to include additional rules such as the following rule for drawing the stick figure on a skateboard:
SkateBoard
precondition: if user has chosen to draw the figure on a skateboard
execution: draw stick figure on a skate board Rules may be modified to reflect the addition of a new input. For example, the new input may include "skateboard" and new rules may be added so that the stick figure for different poses may be drawn without changing the stick figure application. The new rules may be added as leaf child rules or added between existing rules as illustrated in FIG. 7.

The flow charts described herein represent exemplary embodiments of methods. The methods may be implemented in software, hardware, or a combination thereof. The order of method may be changed, and various elements may be added, reordered, combined, omitted, modified, etc.

Various modifications and changes may be made to the invention as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

Various embodiments may further include receiving, sending or storing instructions and/or data implemented in accordance with the foregoing description upon a computer readable medium. Generally speaking, a computer readable medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

What is claimed is:

1. A system, comprising:
    a processor;
    a memory comprising program instructions, wherein the program instructions are executable by the processor to:
        determine a hierarchical relationship among a plurality of rules, wherein each of the plurality of rules comprises a precondition and an action to be executed if the precondition is met; and
        evaluate and execute the plurality of rules according to the hierarchical relationship to generate an output;
    wherein, to evaluate and execute the plurality of rules according to the hierarchical relationship, the program instructions are further executable by the processor to:
        evaluate a precondition of a parent rule in the plurality of rules;
        if the precondition of the parent rule is met, evaluate a precondition of one or more child rules of the parent rule according to the hierarchical relationship; and
        if the precondition of the parent rule is not met, skip evaluation of the precondition of the one or more child rules of the parent rule according to the hierarchical relationship.

2. The system as recited in claim 1,
wherein, to evaluate and execute the plurality of rules according to the hierarchical relationship, the program instructions are further executable by the processor to access data for evaluating the preconditions of the plurality of rules; and
wherein, to evaluate a precondition of one of the rules, the program instructions are further executable by the processor to evaluate the precondition of the one of the rules against at least a portion of the data.

3. The system as recited in claim 1, wherein the program instructions implement a code generation application configured to evaluate and execute the plurality of rules according to the hierarchical relationship to generate computer-executable code as the output.

4. The system as recited in claim 1, wherein the program instructions implement a platform-independent, object-oriented code generation application configured to evaluate and execute the plurality of rules according to the hierarchical relationship to generate platform-independent, object-oriented code as the output.

5. The system as recited in claim 1, wherein the program instructions are further executable by the processor to modify the hierarchical relationship of the plurality of rules to reflect addition of a new rule to the plurality of rules.

6. The system as recited in claim 1, wherein the program instructions are further executable by the processor to modify the hierarchical relationship of the plurality of rules to reflect deletion of a rule from the plurality of rules.

7. The system as recited in claim 1, wherein the rules are classes according to an object-oriented programming language.

8. The system as recited in claim 7, wherein the programming language is a platform-independent, object-oriented programming language.

9. The system as recited in claim 7, wherein, to determine a hierarchical relationship among a plurality of rules, the program instructions are further executable by the processor to perform introspection of the plurality of rules to determine the hierarchical relationship among the plurality of rules.

10. The system as recited in claim 7, wherein the hierarchical relationship among the plurality of rules is implemented according to an inheritance relationship among the classes of the object-oriented programming language.

11. The system as recited in claim 1, wherein the plurality of rules extends from a Rule class, wherein the Rule class implements an IRule interface.

12. A system, comprising:
a processor;
a memory coupled to the processor, wherein the memory comprises a plurality of rules, wherein each of the plurality of rules comprises a precondition for evaluation and an action to be executed if the precondition is met;
wherein the plurality of rules are configured for evaluation and execution according to a hierarchical relationship among the plurality of rules to generate output, wherein the hierarchical relationship is configured to indicate one or more child rules to be skipped for evaluation and execution if the precondition of a parent rule is not met.

13. The system as recited in claim 12, wherein said evaluation and execution according to a hierarchical relationship among the plurality of rules to generate output is configured to generate computer-executable code as the output.

14. The system as recited in claim 12, wherein said evaluation and execution according to a hierarchical relationship among the plurality of rules to generate output is configured to generate a platform-independent, object-oriented application as the output.

15. The system as recited in claim 12, wherein the hierarchical relationship of the plurality of rules is configured to be modified to reflect addition of a rule to the plurality of rules.

16. The system as recited in claim 12, wherein the hierarchical relationship of the plurality of rules is configured to be modified to reflect deletion of a rule from the plurality of rules.

17. The system as recited in claim 12, wherein the rules are classes according to an object-oriented programming language.

18. The system as recited in claim 17, wherein the programming language is a platform-independent, object-oriented programming language.

19. The system as recited in claim 17, wherein the hierarchical relationship among the plurality of rules is implemented according to an inheritance relationship among the classes of the object-oriented programming language.

20. The system as recited in claim 12, wherein the plurality of rules extends from a Rule class, wherein the Rule class implements an IRule interface.

21. The system as recited in claim 12, wherein the plurality of rules are configured for evaluation and execution according to the hierarchical relationship to generate output by a rules engine.

22. A method, comprising:
determining a hierarchical relationship among a plurality of rules, wherein each of the plurality of rules comprises a precondition and an action to be executed if the precondition is met; and
evaluating and executing the plurality of rules according to the hierarchical relationship to generate an output, wherein said evaluating and executing comprises:
evaluating a precondition of a parent rule in the plurality of rules;
if the precondition of the parent rule is met, evaluating a precondition of one or more child rules of the parent rule according to the hierarchical relationship; and
if the precondition of the parent rule is not met, skipping evaluation of the precondition of the one or more child rules of the parent rule according to the hierarchical relationship.

23. The method as recited in claim 22,
wherein said evaluating and executing the plurality of rules according to the hierarchical relationship comprises accessing data for evaluating the preconditions of the plurality of rules; and
wherein said evaluating a precondition of one of the rules comprises evaluating the precondition of the one of the rules against at least a portion of the data.

24. The method as recited in claim 22, wherein said output includes computer-executable code.

25. The method as recited in claim 22, wherein said output is a platform-independent, object-oriented application.

26. The method as recited in claim 22, further comprising modifying the hierarchical relationship of the plurality of rules to reflect addition of a new rule to the plurality of rules.

27. The method as recited in claim 22, further comprising modifying the hierarchical relationship of the plurality of rules to reflect deletion of a rule from the plurality of rules.

28. The method as recited in claim 22, wherein the rules are classes according to an object-oriented programming language.

29. The method as recited in claim 28, wherein the programming language is a platform-independent, object-oriented programming language.

30. The method as recited in claim 28, wherein said determining a hierarchical relationship among a plurality of rules is performed using introspection.

31. The method as recited in claim 28, wherein the hierarchical relationship among the plurality of rules is implemented according to an inheritance relationship among the classes of the object-oriented programming language.

32. The method as recited in claim 22, wherein the plurality of rules extends from a Rule class, wherein the Rule class implements an IRule interface.

33. A computer-accessible medium comprising program instructions, wherein the program instructions are configured to implement:
- determining a hierarchical relationship among a plurality of rules, wherein each of the plurality of rules comprises a precondition and an action to be executed if the precondition is met; and
- evaluating and executing the plurality of rules according to the hierarchical relationship to generate an output;
- wherein, in said evaluating and executing the plurality of rules according to the hierarchical relationship to generate an output, the program instructions are further configured to implement:
  - evaluating a precondition of a parent rule in the plurality of rules;
  - if the precondition of the parent rule is met, evaluating a precondition of one or more child rules of the parent rule according to the hierarchical relationship; and
  - if the precondition of the parent rule is not met, skipping evaluation of the precondition of the one or more child rules of the parent rule according to the hierarchical relationship.

34. The computer-accessible medium as recited in claim 33,
wherein, in said evaluating and executing the plurality of rules according to the hierarchical relationship, the program instructions are further configured to implement accessing data for evaluating the preconditions of the plurality of rules; and
wherein, in said evaluating a precondition of one of the rules, the program instructions are further configured to implement evaluating the precondition of the one of the rules against at least a portion of the data.

35. The computer-accessible medium as recited in claim 33, wherein said output includes computer-executable code.

36. The computer-accessible medium as recited in claim 33, wherein said output is a platform-independent, object-oriented application.

37. The computer-accessible medium as recited in claim 33, wherein the program instructions are further configured to implement modifying the hierarchical relationship of the plurality of rules to reflect addition of a new rule to the plurality of rules.

38. The computer-accessible medium as recited in claim 33, wherein the program instructions are further configured to implement modifying the hierarchical relationship of the plurality of rules to reflect deletion of a rule from the plurality of rules.

39. The computer-accessible medium as recited in claim 33, wherein the rules are classes according to an object-oriented programming language.

40. The computer-accessible medium as recited in claim 39, wherein the programming language is a platform-independent, object-oriented programming language.

41. The computer-accessible medium as recited in claim 39, wherein said determining a hierarchical relationship among a plurality of rules is performed using introspection.

42. The computer-accessible medium as recited in claim 39, wherein the hierarchical relationship among the plurality of rules is implemented according to an inheritance relationship among the classes of the object-oriented programming language.

43. The computer-accessible medium as recited in claim 33, wherein the plurality of rules extends from a Rule class, wherein the Rule class implements an IRule interface.

* * * * *